June 25, 1929.    O. R. SCHURIG    1,718,494
ELECTROMAGNETIC PRESSURE MEASURING MEANS
Filed Aug. 2, 1923
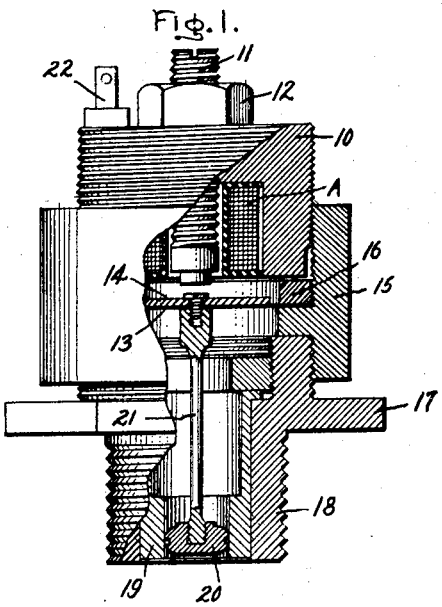
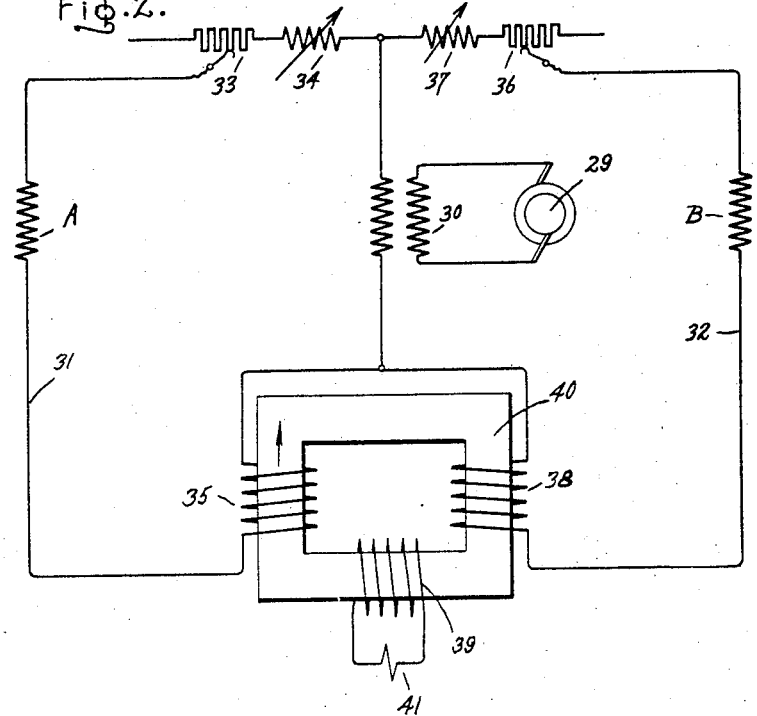
Inventor:
Otto Robert Schurig,
by
His Attorney.

Patented June 25, 1929.

1,718,494

UNITED STATES PATENT OFFICE.

OTTO ROBERT SCHURIG, OF SCHENECTADY, NEW YORK, ASSIGNOR TO GENERAL ELECTRIC COMPANY, A CORPORATION OF NEW YORK.

ELECTROMAGNETIC PRESSURE-MEASURING MEANS.

Application filed August 2, 1923. Serial No. 655,368.

My invention relates to a pressure measuring means. It more particularly relates to apparatus for measuring instantaneous or transient pressures by electromagnetic means.

The object of my invention is to provide apparatus for measuring the instantaneous or transient pressures which exist in explosion chambers and the like.

I accomplish the object of my invention by varying the character of a magnetic field in response to the pressures under measurement and providing a recording instrument which is sensitive to the varying magnetic field to record the pressures.

In carrying out my invention, I take advantage of the fact that variations in the air gap of a magnetic circuit causes a change in the reluctance of said circuit, and by changing this air gap in response to and in proportion to the pressures under measurement I am able to influence suitable instruments to thereby record the said pressures.

My invention further consists in the arrangement and combination of elements hereinafter set forth and particularly pointed out in the claims annexed to and forming a part of this specification.

My invention will be best understood by reference to the accompanying drawings, in which I have shown a preferred embodiment thereof, and which will be described later. I desire to have it understood, however, that various changes can be made in the construction and arrangement of the parts without departing from the spirit and scope of my invention.

In the drawing, Fig. 1 is a side elevation partially in section of a modification of my invention. It shows the relative location of the various parts and the manner of securing the same: Fig. 2 is a diagram of connections which show the manner of connecting the various pieces of apparatus in an electric circuit for carrying out my invention.

To simplify the explanation of the invention and facilitate an understanding thereof, I will describe the form of device which I have developed for carrying out my invention and point out the various details relating thereto.

Referring to Fig. 1, 10 is a threaded cylindrical cup of magnetic material for supporting a coil A. It is shown as composed of solid metal but it can be of laminated construction where the frequency of the electrical circuit warrants such a change. Projecting through the coil A and supported by the cup 10, is an adjustable core 11 of magnetic material which can be locked in any desired position by means of nut 12.

Adjacent the inner end of the core 11 is a flexible diaphragm 13 carrying a disc 14 composed of magnetic material. While I have shown the disc 14 in the drawing as a part of my device it should be understood that it is not a necessary element where the diaphragm itself is of magnetic material. When a short period of vibration is desired in the diaphragm 13 it is desirable to omit the disc member 14 and in that way reduce the total mass of the moving element and thereby decrease its period of vibration. The diaphragm 13 is supported by an annular member 15 and is held in place by a threaded ring 16. The annular member 15 also supports the cup 10 and is itself supported by a threaded plug member 17 having a threaded portion 18 which is adapted to be screwed into the wall of the chamber wherein measurements of pressure are desired.

Within the threaded portion 18 of the plug member 17 is a cylinder 19 and cooperating with the cylinder 19 is a piston 20 having a rod 21 connected to the diaphragm 13. When the device is in use the piston 20 is exposed to the pressures within the chamber and it will move in response to the varying pressures and at the same time cause the diaphragm 13 to move toward and away from the adjustable core 11.

A number of interchangeable cylinders 19 of different internal diameter and cooperating pistons 20 can be provided so that a number of pressure ranges can be measured with the same diaphragm and setting of the device. While I have shown a piston 20 and cylinder 19 it should be understood that the parts 17, 18, 19, 20 and 21 may be omitted and that member 15 may be made with threads cut on its outside surface, thus permitting member 15 to be screwed in to the chamber in which pressure measurements are desired. The diaphragm 13 is then acted on directly by the pressure to be measured, without the use of an intervening piston. Projecting from the top of the cup 10 are two studs 22 for electrically connecting coil A of the device to a suitable source of power and recording instrument.

The operation of my device will be better understood by considering it in connection with the other elements of the system to which it is adapted. In United States Patent 1,640,464, August 30, 1927, and assigned to the same assignee as the present invention, is a diagram of connections to which my device is adapted. This diagram of connections is shown in Fig. 2 of the drawing but it forms no part of the present invention.

In Fig. 2, 29 is a source of alternating current and energized thereby is a transformer 30 having its secondary connected to energize two circuits 31 and 32. Connected in the circuit 31 is a variable resistance 33, a variable inductance 34 and a winding 35 of a transformer 40 and coil A of my device. Connected in the circuit 32 are similar elements, a variable resistance 36, a variable inductance 37 and a winding 38 of the transformer 40 and a coil B which is similar to coil A mentioned above. The variable resistances and inductances mentioned above are provided to facilitate balancing of the circuits and can be omitted when the balance can be obtained by other means.

In the preceding paragraph, the coil B is said to have characteristics similar to those of coil A. What is meant is that the coil B should have substantially the same values of inductance and resistance as coil A, so that its effect on the system can be balanced against the effect created by coil A on the system. It should be understood, however, that the coil B referred to above can be dispensed with when the inductance 37 and the resistance 36 or other means are sufficiently sensitive to obtain the balanced condition required.

The winding 35 of transformer 40 in circuit 31 and the winding 38 of the transformer 40 in circuit 32 are connected to oppose each other. When the circuits 31 and 32 each have the same inductance and resistance the two windings 35 and 38 will oppose each other equally since the currents flowing therein will be 180° from each other in phase displacement and no flux will flow in the core of the transformer 40, but when the reactance of one of the circuits 31 or 32 changes by reason of a change in the air gap adjacent coil A, a corresponding change in the current of the winding 35 will result and flux will flow in the core of transformer 40. The transformer 40 has in addition to the two primary windings 35 and 38 a secondary winding 39 which is energized in proportion to the unbalance of the circuits 31 and 32. The secondary winding 39 of the transformer 40 is connected to influence an oscillograph or other suitable recording instrument 41.

Assuming that it is desired to measure the pressures which are created by the arc in the oil chamber of a high capacity oil circuit breaker when the circuit is opened, or in the explosion chamber of a gun when fired. My device is first screwed into the wall of the explosion chamber in such a way that the piston 20 will be exposed to the pressures which exist therein. The coil A is then connected in circuit 31 in series with the other devices of the circuit and the coil B is connected in circuit 32 in series with the other devices of that circuit. The circuits 31 and 32 are then balanced by adjusting the variable resistances 33 and 36, the variable inductances 34 and 37 and adjusting the magnetic circuits of coils A and B so that no deflection is recorded by the oscillograph. When the circuit breaker is opened or the gun is fired the pressures which exist as a result, will move the piston 20, and the piston 20 by means of rod 21 will move the diaphragm 13 and member 14 in the magnetic field created by coil A and vary its reluctance, thereby changing the reactance of coil A and causing an unbalance of the currents flowing in circuits 31 and 32 and as a result a current will be induced in the winding 39 of the transformer 40 which will operate the oscillograph and make a graphic record corresponding to the variations in the pressure which exist during the cycle under measurement. With proper calibration the graphic record can be interpreted in terms of pressure. Another important feature of my invention is that with the indicating instrument which I prefer to use, namely; an oscillograph, a time indication can be recorded upon the record so that not only can the pressures under determination be found but the exact relation the pressure bears to other functions of the device can also be found with great accuracy.

While I have shown and described a device adapted to the measurement of pressures in the explosion chamber of a high capacity oil circuit breaker or a gun, I desire to have it understood that various changes could be made in the construction and many widely different embodiments of this invention might be made without departing from the scope thereof, it is intended that all matters contained in the foregoing description or shown in the accompanying drawing shall be interpreted as illustrative and not in a limited sense.

What I claim as new and desire to secure by Letters Patent of the United States, is:

1. An electromagnetic device responsive to pressure changes comprising a cup-shaped magnetic structure, a central core piece in said structure, a coil on said core, a magnetic diaphragm supported across and adjacent the open end of said cup structure, a cylinder, a movable piston in said cylinder responsive to pressure changes and low inertia means connected between said piston and diaphragm for communicating the movements of said piston directly to said diaphragm.

2. In a pressure recording system, electromagnetic means comprising an electromagnet, a magnetic diaphragm armature for said electromagnet included in the magnetic circuit thereof and movable toward and away from said electromagnet to vary the reluctance of its magnetic circuit, a cylinder and piston, said piston being removably secured to said diaphragm and adapted to be exposed to fluid pressures in said cylinder so as to vibrate said diaphragm toward and away from said electromagnet in response to fluid pressure changes, a casing for supporting said parts in their operative relation, and means for removably securing said cylinder in said casing whereby said piston and cylinder are removable from said casing so as to be interchangeable with others having different pressure areas to adjust said apparatus for different fluid pressures.

In witness whereof, I have hereunto set my hand this 1st day of August, 1923.

OTTO ROBERT SCHURIG.